(12) United States Patent
Bacchini et al.

(10) Patent No.: US 12,126,150 B2
(45) Date of Patent: Oct. 22, 2024

(54) METHOD FOR FESTOONING A POWER CABLE

(71) Applicant: Prysmian S.p.A., Milan (IT)

(72) Inventors: Marco Bacchini, Bernareggio (IT); Simone Manfredi, Milan (IT); Mario Genovesi, Cremona (IT)

(73) Assignee: Prysmian S.p.A., Milan (IT)

( * ) Notice: Subject to any disclaimer, the term of this patent is extended or adjusted under 35 U.S.C. 154(b) by 196 days.

(21) Appl. No.: 17/854,848

(22) Filed: Jun. 30, 2022

(65) Prior Publication Data
US 2023/0006429 A1    Jan. 5, 2023

(30) Foreign Application Priority Data
Jul. 1, 2021   (IT) .................. 102021000017399

(51) Int. Cl.
*H02G 1/08*   (2006.01)

(52) U.S. Cl.
CPC ............. *H02G 1/081* (2013.01); *H02G 1/088* (2013.01)

(58) Field of Classification Search
CPC .......... H02G 1/081; H02G 1/088; H02G 9/08; H02G 11/003
See application file for complete search history.

(56) References Cited

U.S. PATENT DOCUMENTS

| | | | | | |
|---|---|---|---|---|---|
| 3,289,983 | A | * | 12/1966 | Mennerdahl ............ | B66C 13/12 248/58 |
| 4,078,769 | A | * | 3/1978 | Wamfler .............. | H02G 11/003 384/54 |

(Continued)

FOREIGN PATENT DOCUMENTS

| | | |
|---|---|---|
| CN | 110212458 A | 9/2019 |
| GB | 2383200 A | 6/2003 |
| GB | 2468883 A | 9/2010 |
| GB | 2495503 A | 4/2013 |

(Continued)

*Primary Examiner* — Benjamin F Fiorello
(74) *Attorney, Agent, or Firm* — Slater Matsil, LLP

(57) ABSTRACT

The present disclosure relates to a method for festooning a power cable while deploying it in a deployment site comprising a rail having a start and an end, the method comprising the steps of: providing the cable with a plurality of cable holders slidably movable along the rail, each two consecutive holders being spaced at a holder predetermined distance on the cable; providing a festooning apparatus after the start of the rail, the festooning apparatus comprising a lowering device movable between a raised position and a lowered position; deploying the cable along the rail by repeating the following sub-steps: engaging on the rail one holder after the other and moving them thereon; when one holder oversteps the festooning apparatus, operating the festooning apparatus to move the lowering device from the raised position towards the lowered position, thus engaging the cable at a point between two consecutive holders; when the lowering device reaches the lowered position, obtaining a sagged portion of cable and a shortening of the holder predetermined distance; operating the festooning apparatus to move the lowering device from the lowered position towards the raised position, thus disengaging it from the cable; fixing the shortened holder predetermined distance between two consecutive holders at each side of the sagged cable portion; and advancing the sagged cable portion along the rail.

20 Claims, 3 Drawing Sheets

(56) References Cited

U.S. PATENT DOCUMENTS

| | | | | |
|---|---|---|---|---|
| 4,093,047 | A | * | 6/1978 | Wampfler ............ H02G 11/003 248/51 |
| 4,667,782 | A | * | 5/1987 | Toase ...................... E21F 17/06 248/51 |
| 4,846,320 | A | * | 7/1989 | Clarke .................. B60L 3/0069 248/51 |
| 5,518,339 | A | | 5/1996 | Shimizu |
| 5,524,548 | A | * | 6/1996 | Fox .......................... B61H 7/00 188/42 |
| 2007/0056463 | A1 | * | 3/2007 | Rodnunsky .......... F16M 11/425 104/173.1 |
| 2009/0026032 | A1 | * | 1/2009 | Maier .................. H02G 11/003 191/12.2 R |
| 2010/0200289 | A1 | * | 8/2010 | Neuber ................... F16L 3/015 174/40 R |
| 2022/0052515 | A1 | | 2/2022 | Bacchini et al. |
| 2022/0360057 | A1 | | 11/2022 | Bacchini et al. |

FOREIGN PATENT DOCUMENTS

| | | |
|---|---|---|
| GB | 2554873 A | 4/2018 |
| KR | 20170061932 A | 6/2017 |
| KR | 101915432 B1 | 11/2018 |

\* cited by examiner

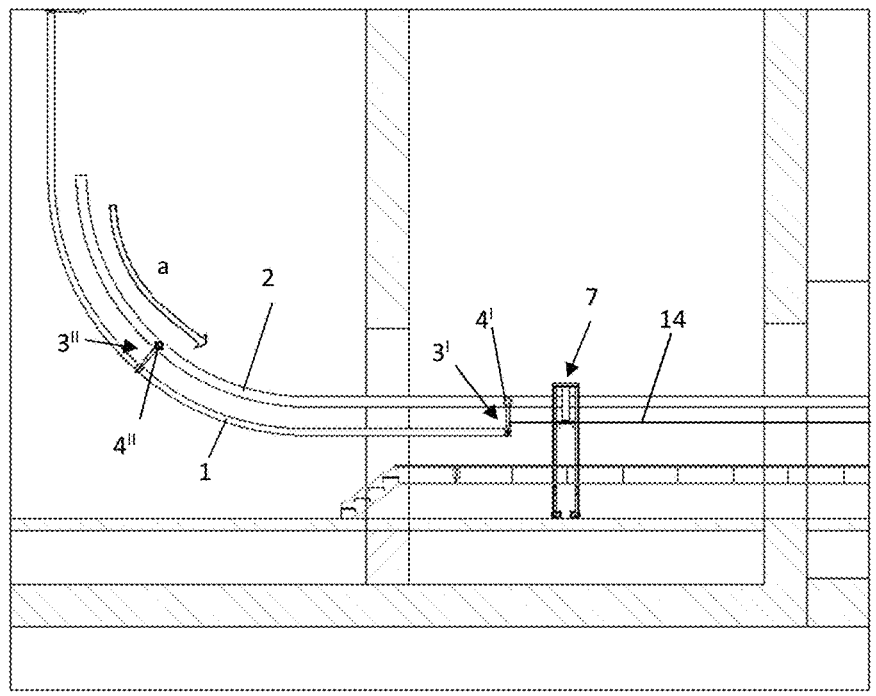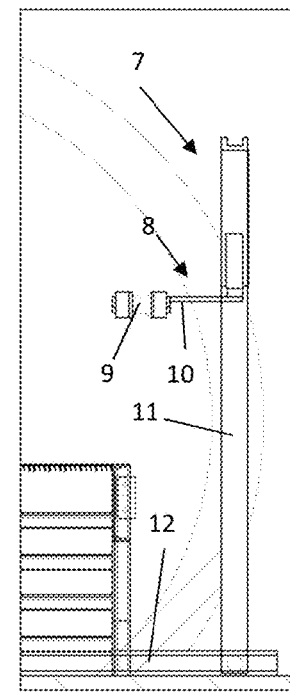
FIG. 2a  FIG. 2b
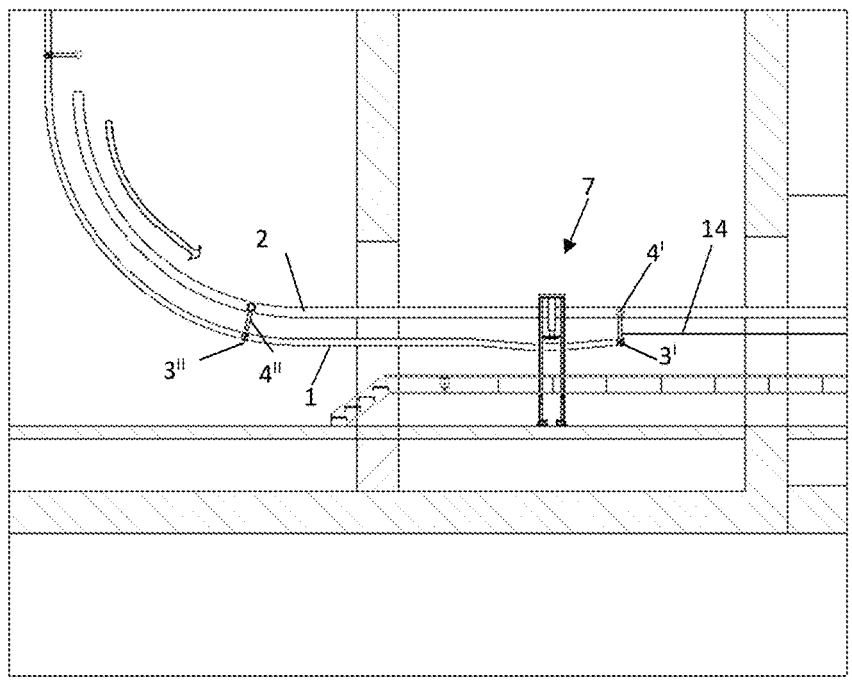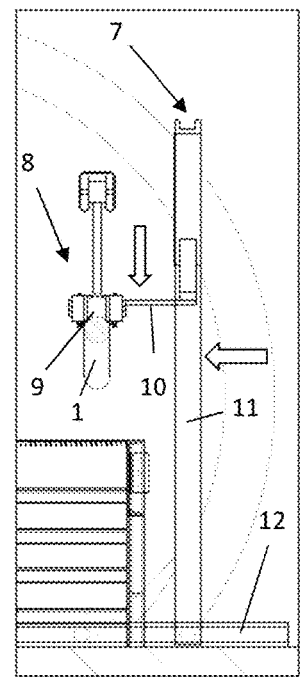
FIG. 3a  FIG. 3b

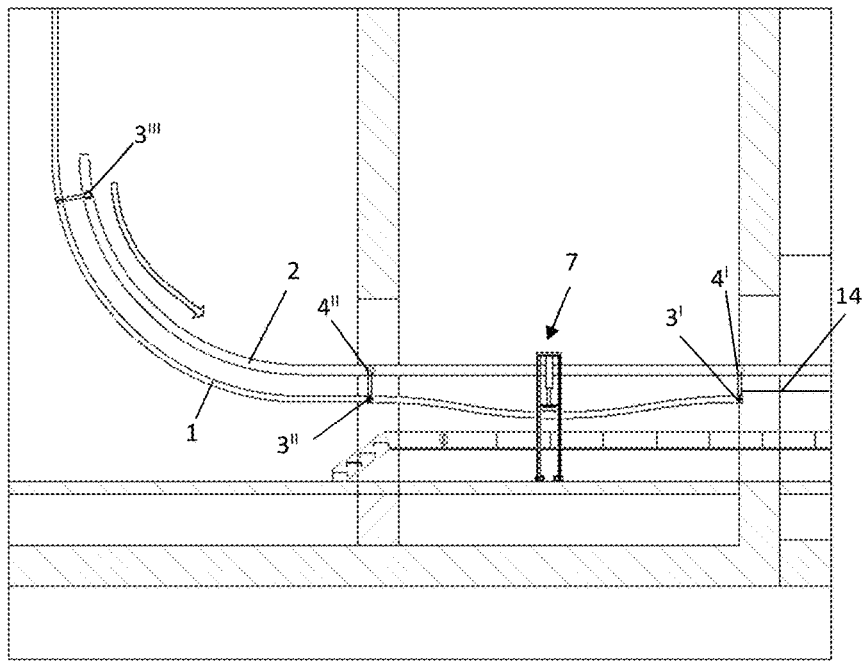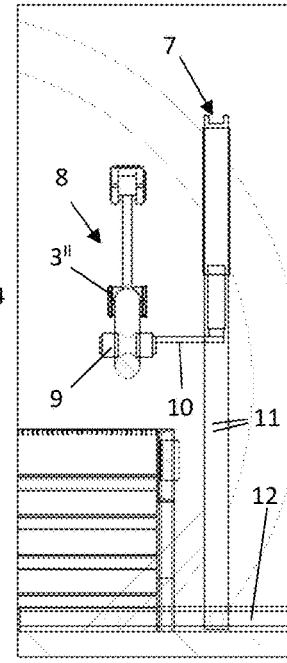
FIG. 4a     FIG. 4b
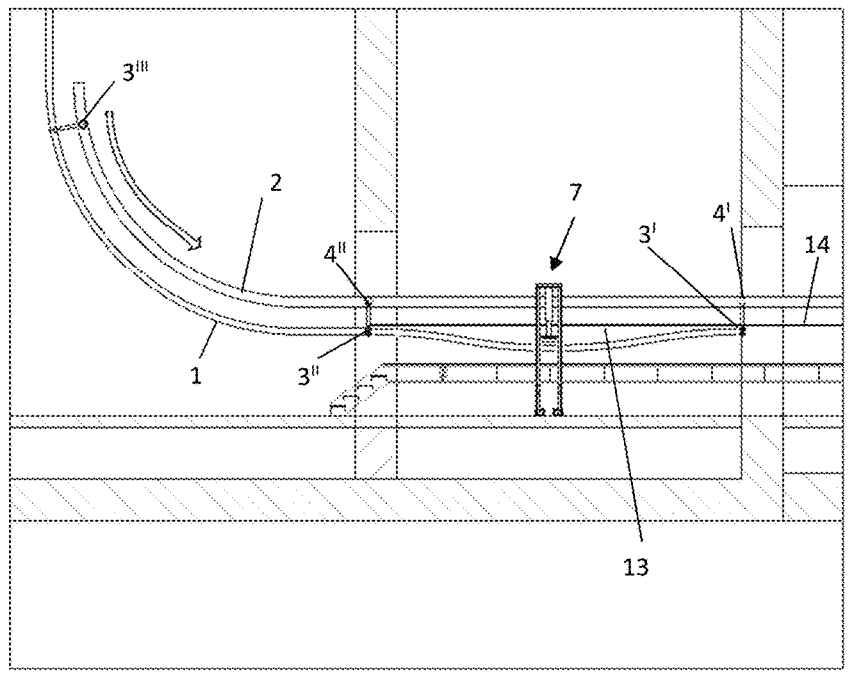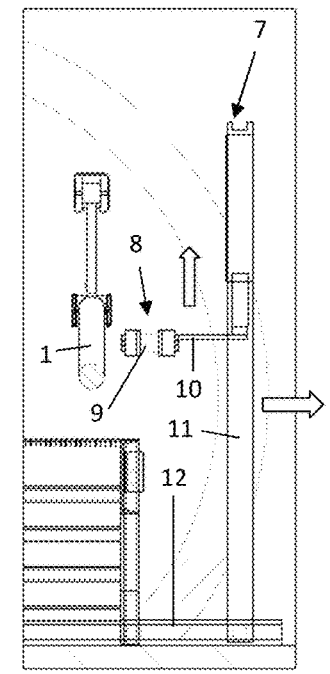
FIG. 5a     FIG. 5b

METHOD FOR FESTOONING A POWER CABLE

CROSS-REFERENCE TO RELATED APPLICATIONS

This application claims priority to Italian Application No. 102021000017399, filed on Jul. 1, 2021, which application is hereby incorporated herein by reference.

TECHNICAL FIELD

The present disclosure relates to a method for festooning a power cable, such as an underground high voltage cable, while deploying it in a deployment site.

BACKGROUND

According to known methods and systems, cable deployment can imply positioning the cable on supports attached to a wall on a deposition site, for example in the case of cable undergrounding. Even if underground cables, when compared to equivalent overhead lines, are more expensive, they allow ensuring uninterrupted power supply in sites less suitable for overhead systems due to, e.g., heavy winds and gales, failure of supporting structures, landscape appearance, etc. Therefore, in certain areas, the benefits of underground cables outweigh disadvantages of undergrounding. Among the various cable underground installation methods, tunnel installation is generally used in urban locations where direct bury installation would cause unacceptable disruption, or to cross physical obstacles such as rivers, lakes etc.

In cable underground deposition processes, the cable is to be festooned along the deposition site, mainly to avoid kinking in case of thermal expansion and to significantly reduce all thermal-mechanic forces generated during the cable service. To this end, generally an excess length of cable is positioned on the support by slidable means, such as rollers, and the desired sagging is achieved by an operator pushing the cable into position. Such an operation can be, however, time-consuming and imprecise.

SUMMARY

Embodiments discussed in this application provide a method for festooning a power cable in an unmanned, time-effective, safe and precise manner.

Embodiments describe a method wherein a cable is festooned during its deployment on the final site. The cable is provided with a plurality of holders at a proper distance and slidable along a rail supporting the cable itself at the deployment site. A festooning apparatus comprises a device pushing the cable portion between two consecutive holders to the sought cable sagging while the cable is advancing. The two consecutive holders are then fixed for maintaining the obtained sagging. The festooning process is repeated for each couple of holders along the cable until the cable deployment is completed.

Accordingly, the present disclosure relates to a method for festooning a power cable while deploying it in a deployment site comprising a rail having a start and an end, the method comprising the steps of: providing the cable with a plurality of cable holders slidably movable along the rail, each two consecutive holders being spaced at a holder predetermined distance on the cable; providing a festooning apparatus after the start of the rail, the festooning apparatus comprising a lowering device movable between a raised position and a lowered position; deploying the cable along the rail by repeating the following sub-steps: engaging on the rail one holder after the other and moving them thereon; when one holder oversteps the festooning apparatus, operating the festooning apparatus to move the lowering device from the raised position towards the lowered position thus engaging the cable at a point between two consecutive holders; when the lowering device reaches the lowered position obtaining a sagged cable portion and a shortening of the holder predetermined distance; operating the festooning apparatus to move the lowering device from the lowered position towards the raised position, thus disengaging it from the cable; fixing the shortened holder predetermined distance between two consecutive holders at each side of the cable sagged portion; and advancing the sagged cable portion toward the rail end.

According to an embodiment, the festooning apparatus is movable transversally to the cable advancing direction along the rail between a first side position closer to the cable and a second side position farer from the cable, and the step of deploying the cable along the rail further comprises the sub-steps of: operating the festooning apparatus to move from the second side position to the first side position before the lowering device is moved from the raised position towards the lowered position; operating the festooning apparatus to move from the first side position to the second side position after the lowering device is moved from the lowered position towards the raised position.

In an embodiment, the method of the present disclosure comprises repeating the sub-steps of the step of deploying the cable along the rail while maintaining the cable advancing along the rail.

In an embodiment, the step of deploying the cable along the rail comprises pulling at least one by a pulling rope.

In an embodiment, the sub-step of fixing the shortened holder predetermined distance is attained by connecting a spacer to the two consecutive holders. The spacer may be a rod or a rope. In an alternative embodiment, the sub-step of fixing the shortened holder predetermined distance can be attained by connecting the pulling rope, connected to a first holder of the two consecutive holders for pulling it before the sagged portion of cable is obtained, to a second holder of the two consecutive holders once the sagged portion of cable is obtained.

BRIEF DESCRIPTION OF THE DRAWINGS

Further characteristics and advantages will be more apparent from the following description of some embodiments given as a way of an example with reference to the enclosed drawings in which:

FIGS. 2a and 2b show, respectively in a side view and in a view transversal to the cable advancing direction, steps of a method for festooning the cable according to an embodiment;

FIGS. 3a and 3b show, respectively in the same side and transversal views of FIGS. 2a and 2b, further steps of the method for festooning the cable according to an embodiment;

FIGS. 4a and 4b show, respectively in the same side and transversal views of FIGS. 2a and 2b, further steps of the method for festooning the cable according to an embodiment;

FIGS. 5a and 5b show, respectively in the same side and transversal views of FIGS. 2a and 2b, further steps of the method for festooning the cable according to an embodiment.

DETAILED DESCRIPTION OF ILLUSTRATIVE EMBODIMENTS

Figure 1:
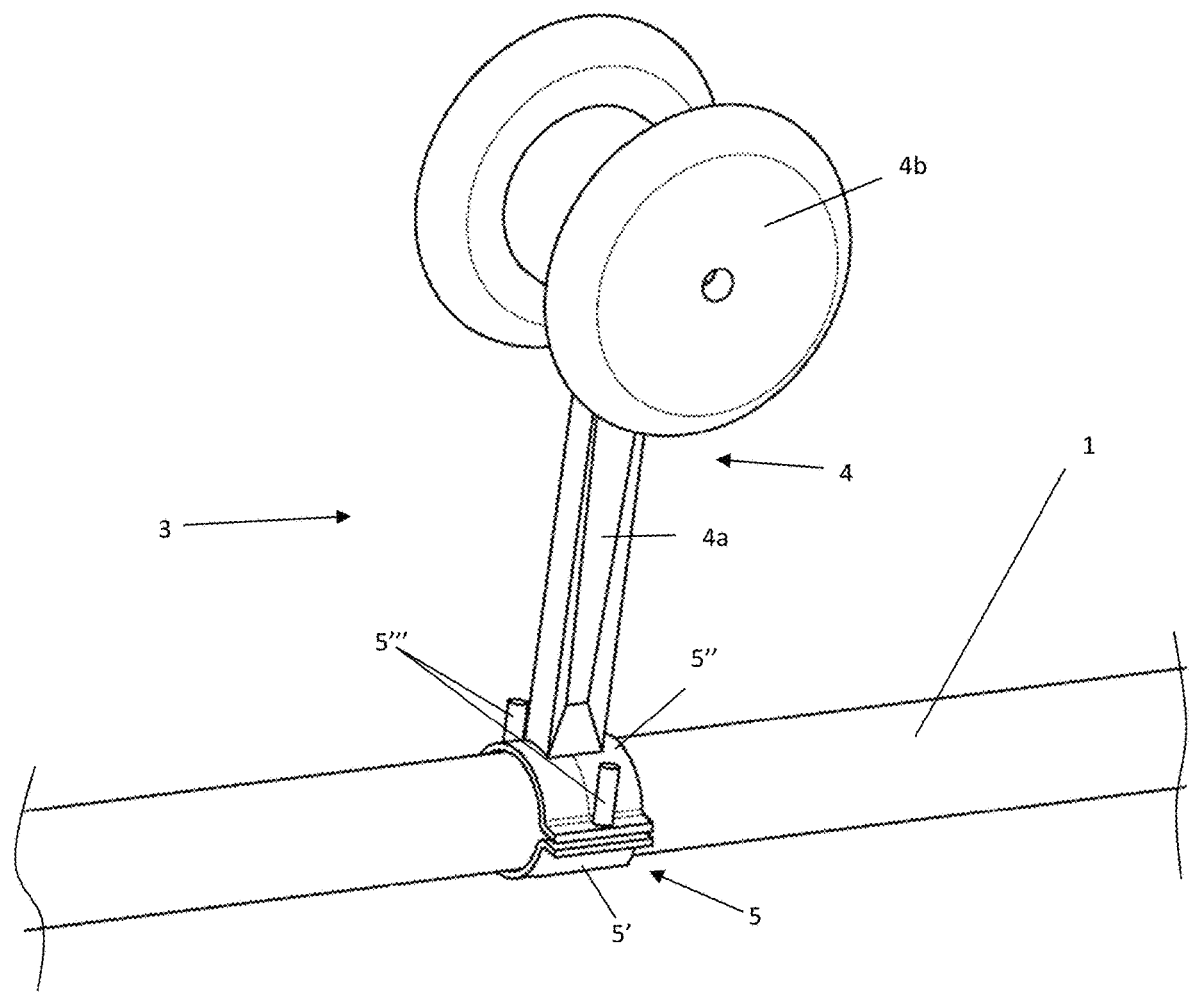
FIG. 1 shows a perspective view of a cable provided with a holder as part of an equipment for festooning the cable according to an embodiment.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

With reference to the attached Figures, the aim of the method according to the present disclosure is festooning a cable 1, such as an underground HV cable, while deploying it in an intended deployment site including a fixed support, for example a rail 2 supporting at least one portion of the cable 1 itself. For example, a single length of cable can be installed from a starting point to an end point, wherein part of the cable length is in a tunnel, and the remaining part/s is/are outside of the tunnel. For example, the tunnel is under the ground level and the starting point and the end point are at the ground level. Possible methods and equipment for the installation of a power cable in a deployment site, wherein the cable is supported by a rail, are disclosed in the Italian patent applications of the Applicant nos. 102020000019975 and 102021000011645, which are hereby incorporated by reference.

The cable 1 is provided with a plurality of cable holders 3 slidable along the rail 2. A possible method for applying said holders to the cable is disclosed in the above-mentioned Italian patent application no. 102021000011645. The holders 3 are at a predetermined distance on the cable 1. The distance between two consecutive holders 3 (holder predetermined distance) is generally the same for all the couples of consecutive holders provided on the cable 1. The holder predetermined distance is set to provide the sought cable sagging, as will be described in detail below.

As per FIG. 1, in an embodiment, each holder 3 comprises a clamp 5 optionally made of two parts which are releasably connectable one another so to lock a portion of cable 1. For example, each clamp 5 comprises a first bracket 5' and a second bracket 5" joined by fasteners 5'" around a portion of cable 1 in a releasable manner.

Each holder 3 comprises a respective trolley 4. The trolley 4 comprises bearings 4b and, optionally, a trolley bar 4a. Said trolley 4 is suitable to be positioned on and slide along the rail 2. In an embodiment, the second bracket 5" is connected to a trolley 4 at a side opposite to that joining the first bracket 5'. In an embodiment, the second bracket 5" is directly connected to trolley bearings 4b, thus no trolley bar 4a is present.

In order to minimize the friction with the guiding rail 1, bearings 4b have a low friction coefficient.

In an embodiment, each holder 3 can be connectable to a pulling rope driven by a pulling device (both not shown). Once connected to the pulling rope, each holder 3 can be made to slide along the rail 2 thanks to the pulling force exerted by the pulling rope and can integrally carry the cable 1. The connection among the pulling rope and at least one of the holders bearing the cable and the sliding of the holders engaged to the rail 2 allow moving the cable 1 longitudinally along the rail 2 to reach the final deployment position by dragging the pulling rope.

According to the present disclosure, the cable 1 is festooned during its longitudinal movement. To this aim, a festooning apparatus 7 is provided.

As shown in the FIGS. 2a-5b, the festooning apparatus 7 is positioned after the start of the rail 2.

As it can be appreciated by the skilled persons, the position of the festooning apparatus 7 with respect to the rail 2 (i.e. festooning predetermined distance) shall be selected in view of the intended cable portion to be festooned (sagged) and of the location thereof. In the example of FIGS. 2a-5b, where the deployment site comprises a tunnel and the cable portion intended to stay in the tunnel is to be festooned, the festooning apparatus 7 is positioned inside the tunnel and in the vicinity of its entrance.

As shown in the FIGS. 2a-5b, the festooning apparatus 7 acts on subsequent portions of cable 1 comprised between two consecutive holders $3^I$ and $3^{II}$ longitudinally moving along the rail 2, for example by means of respective trolleys $4^I$ and $4^{II}$.

The festooning apparatus 7 comprises a lowering device 8 movable transversally, in particular substantially parallel to the gravity acceleration, with respect to the advancing direction of the cable 1, between a raised position and a lowered position. When the lowering device 8 is in the raised position, the cable 1 is disengaged by the lowering device 8, whereas, when the lowering device 8 moves from the raised position to the lowered position, the cable 1 is engaged at a point which is accordingly moved downward. In an embodiment, the lowering device 8 acts as a pusher on the engaged cable 1 point, i.e. it pushes the latter downwards.

In an embodiment, the lowering device 8 comprises one or more, for example a couple of, rollers 9 shaped to engage the cable 1 and, optionally, to roll thereon. A roller 9 can be, for example, positioned at a tip of an arm 10 of the lowering device 8 which can be lowered and raised, and the roller 9 accordingly, between the above-mentioned raised and lowered positions. The arm 10 can be powered by a hydraulic actuator, between the raised and the lowered positions along a frame 11.

In an embodiment, the frame 11 of the festooning apparatus 7 can be movable for example along fixed guides 12 transversally positioned with respect to the cable 1 advancing direction, in particular perpendicularly positioned with respect to the cable 1 advancing direction and with respect to the lowering device 8 moving direction between the raised and the lowered positions. Due to the movement of the frame 11 relative to the guides 12, the lowering device 8 can additionally be moved between a first side position closer to the cable and a second side position far from the cable. In the first side position the lowering device 8, if lowered, engages the cable 1, whereas in the second side position the lowering device 8 cannot interact with the cable in any position between the raised and the lowered positions. The necessity of moving the frame 11 between the first and second side position can depend on the configuration of the lowering device 8, and can be evaluated by the skilled person on a case by case basis.

Starting, by way of example, from a condition where the lowering device 8 is in the raised position and, optionally, in the second side position further from the cable 1 (FIGS. 2a and 2b), the cable 1 is advancing (from left to right in the figures, according to the depicted arrow a) supported by a plurality of holders 3 slidable along the rail 2 towards the festooning apparatus 7. Particularly, in the Figures two consecutive holders $3^I$ and $3^{II}$ with respective trolleys $4^I$ and $4^{II}$ bearing the cable 1 are shown. Holder $3^I$ is shown as the first holder bearing the cable 1, but this is only for illustrative purposes. In the practice, holder $3^I$ can be any holder bearing a portion of cable 1 intended to be sagged.

Once, due to the cable 1 advancing, each of two consecutive holders $3^I$ and $3^{II}$ (FIGS. 3a and 3b) is at one side of the lowering device 8, the frame 11 may move towards the first side position (closer to the cable i) if the circumstances so require, and the arm 10 is lowered towards the lowered position so that the rollers 9 (in the depicted case, a pair of rollers) can engage a point of the cable 1 between said two consecutive holders $3^I$ and $3^{II}$.

In an embodiment, the above-mentioned movements of the lowering device 8 take place while the cable 1 is advancing, i.e. the cable 1 is never stopped in its advancing. Accordingly, these movements are started—together or in subsequent moments—when the first holder $3^I$ just overpassed the festooning apparatus 7, and the arm 10 reaches the lowered position when the lowering device 8 is halfway between the two consecutive holders $3^I$ and $3^{II}$.

In an alternative embodiment, the cable 1 advancing is stopped when the festooning apparatus 7 is halfway the two consecutive holders $3^I$ and $3^{II}$, and the arm 10 is lowered only once it is in this halfway position or close to the same. Similarly, the frame 11 movement towards the first side position, when needed, can take place only after the cable advancing is stopped, or, alternatively, it can be started shortly before the cable 1 is stopped, provided that the lowering device 8 is already in an intermediate position between the two consecutive holders $3^I$ and $3^{II}$ so that the lowering device 8 does not interfere with the first holder $3^I$.

The rollers 9 can touch the cable 1 and start pushing it down at any point before the holder predetermined distance half (FIGS. 3a and 3b). During the lowering of the lowering device 8, the distance (holder predetermined distance) between the two consecutive holders $3^I$ and $3^{II}$, which can be kept freely slidable along the rail 1, decreases due to the festooning of the cable 1 portion between them. Once the lowering device 8 and its roller/s 9 reaches/reach the lowered position at the holder predetermined distance half, the cable 1 reaches the sought sagged configuration (FIGS. 4a and 4b) and the holder predetermined distance is shortened.

Then, the arm 10 is raised again towards the raised position to disengage the cable 1 and the frame 11, when needed, may be moved towards the second side position further from the cable (FIGS. 5a and 5b).

As said above, to make the cable 1 advancing, at least one holder 3 is be connected to a pulling rope (not illustrated). For example, a plurality of holders 3 mounted on the rail 2 and bearing the cable 1 are connected to a pulling rope, comprising one or more of the holders bearing a portion of cable 1 to be sagged. Once the sagging of the cable 1 portion between the holders $3^I$ and $3^{II}$ is obtained, such configuration should be maintained even in presence of the pulling force exerted by the pulling rope. To this end, the shortened holder predetermined distance between the holders $3^I$ and $3^{II}$ is fixed by a suitable spacer. In the embodiment of FIG. 5a, the spacer is a spacer 13 in form, for example, of a rod or a rope, which is connected to the holders $3^I$ and $3^{II}$ once the cable sagging is obtained. In a non-illustrated embodiment, the spacer can be the pulling rope itself, which is connected to the holder $3^I$ and then, once the cable sagging is obtained, to the holder $3^{II}$ as well. In this manner, even when the first holder $3^I$ is pulled for moving the cable 1 along the advancing direction, the holder $3^{II}$ is in turn pulled by the spacer 13 or by the pulling rope while being maintained at the same distance (the shortened holder predetermined distance) from the first holder $3^I$. Accordingly, the cable sagged configuration of the cable portion between the holders $3^I$ and $3^{II}$ is maintained.

When the spacer 13 is in form of a rod, it can comprise a single rigid element, or, alternatively, a plurality of rigid elements consecutively linked, optionally hinged, together such that the maximum length of the linked rods corresponds to the desired distance between the two consecutive holders $3^I$ and $3^{II}$ in the sagged configuration. When the spacer 13 is in form of a rope (which is not the pulling rope), it is not rigid and its maximum extension corresponds to the desired distance between the two consecutive holders $3^I$ and $3^{II}$ in the cable sagged configuration (i.e. the shortened holder predetermined distance).

In an embodiment, one spacer 13 or the pulling rope can be connected to the holder $3^I$ and to the holder $3^{II}$ in two distinct moments.

In an embodiment, the spacer 13 or the pulling rope is connected to both the holders $3^I$ and $3^{II}$ before the lowering device 8 is raised from the lowered position and disengages the cable 1. Otherwise, if the cable is kept advancing during the festooning, the sagged configuration could be lost.

The above-mentioned festooning process is then repeated for each couple of consecutive holders while the cable is advancing for reaching the final deployment configuration. With reference to the FIG. 5a, the described festooning process is then repeated for the couple of holders $3^{II}$ and $3^{III}$ once the festooning apparatus 7 is between them.

Once the cable 1 reaches the sought deployment position and all the cable portions are festooned as described above, the holders 3 can be locked to the rail 1. The locking of the holders connected to sagged cable portions is made when the shortened holder predetermined distance between the holders was fixed by the pulling rope during the cable advancing, whereas the locking is optional in the case such distance was fixed by a spacer.

A method for festooning a power cable 1 while deploying it in a deployment site comprising a rail 2 having a start and an end, comprises the steps of: providing the cable 1 with a plurality of cable holders 3 slidably movable along the rail 2, the holders 3 being spaced at a holder predetermined distance on the cable 1; each holder 3 can comprise a trolley 4 slidably coupled to the rail 2; providing a festooning apparatus 7 after the start of the rail 2, the festooning apparatus 7 comprising a lowering device 8 movable between a raised position and a lowered position; optionally, the festooning apparatus 7 is movable perpendicularly to the cable advancing direction along the rail 2, between a first side position closer to the cable 1 and a second side position farer from the cable 1; deploying the cable 1 along the rail 2 by repeating the following sub-steps: engaging on the rail 2 one holder 3 after the other and moving them thereon; when one holder 3 oversteps the festooning apparatus 7, operating the festooning apparatus 7 to move the lowering device 8 from the raised position towards the lowered position, thus engaging the cable 1 at a point between two consecutive holders 3I, 3II; this sub-step can comprise pushing the cable 1 downward by the one or more rollers 9 part of the lowering device 8; optionally, before this sub-step, the festooning apparatus 7 can be operated to move from the second side position to the first side position, if this movement is needed; this further sub-step can comprise moving the festooning apparatus 7 along the fixed guides 12; obtaining a sagged cable 1 portion between the consecutive holders 3I, 3II and a shortening of the holder predetermined distance when the lowering device 8 reaches the lowered position, for example at substantially half of the holder predetermined distance; operating the festooning apparatus 7 to move the lowering device 8 from the lowered position towards the raised position thus disengaging it from the cable; optionally, after this sub-step, the festooning apparatus 7 can be operated to move from the first position to the second position, if this movement is needed; fixing the shortened holder predetermined distance between two consecutive holders 3I, 3II at each side of the festooning apparatus 7 for maintaining said sought sagged configuration; this step can be attained by a spacer or the pulling rope which can be connected to only one of the consecutive holders 3I, 3II (for example, the first in the advancing direction) before the sub-step of engaging the cable 1 portion between said consecutive holders 3I, 3II with the lowering device 8; advancing the sagged portion of cable 1 toward the end of the rail 2; this step can comprise pulling at least the first holder 3I by a pulling rope; repeating the above-mentioned sub-steps, where the portion of cable 1 engaged by the festooning apparatus 7 is comprised between holder 3II and 3III, and so forth.

In an embodiment, the sub-steps of the step of deploying the cable along the rail 2 are repeated while maintaining the cable advancing along the rail 1.

In an alternative embodiment, the step of deploying the cable 1 along the rail 2 further comprises the sub-steps of: stopping the cable 1 advancing when the lowering device 8 is halfway the holder predetermined distance before the sub-step of engaging the cable 1 portion between two consecutive holders 3I, 3II by operating the festooning apparatus 7 to move the lowering device 8 from the raised position towards the lowered position; re-starting the cable 1 advancing after the sub-step of disengaging the cable 1 portion between the consecutive holders 3I, 3II by operating the festooning apparatus 7 to move the lowering device 8 from the lowered position towards the raised position.

What is claimed is:

1. A method for festooning a power cable while deploying it in a deployment site comprising a rail having a start and an end, the method comprising:
   providing the power cable with cable holders slidably movable along the rail, each two consecutive of the cable holders being spaced at a holder predetermined distance on the power cable;
   providing a festooning apparatus after the start of the rail, the festooning apparatus comprising a lowering device movable between a raised position and a lowered position;
   deploying the power cable along the rail by repeating a plurality of sub-steps, the plurality of sub-steps comprising:
      engaging, on the rail, one cable holder after the other and moving them thereon;
      after one of the cable holders oversteps the festooning apparatus, operating the festooning apparatus to move the lowering device from the raised position towards the lowered position to engage the power cable at a point between two consecutive holders;
      after the lowering device reaches the lowered position, obtaining a sagged portion of the power cable and a shortening of the holder predetermined distance;
      operating the festooning apparatus to move the lowering device from the lowered position towards the raised position, thus disengaging it from the power cable;
      fixing the shortened holder predetermined distance between two consecutive holders at each side of the sagged portion of the power cable; and
      advancing the sagged portion of the power cable along the rail.

2. The method of claim 1, wherein the festooning apparatus is movable transversally to the power cable advancing direction along the rail between a first side position closer to the power cable and a second side position farther from the power cable.

3. The method of claim 2, wherein the plurality of sub-steps for deploying the power cable along the rail further comprises:
   operating the festooning apparatus to move from the second side position to the first side position before the lowering device is moved from the raised position towards the lowered position; and
   operating the festooning apparatus to move from the first side position to the second side position after the lowering device is moved from the lowered position towards the raised position.

4. The method of claim 1, wherein the plurality of sub-steps for deploying the power cable along the rail are repeated while maintaining the power cable advancing along the rail.

5. The method of claim 1, wherein the step of deploying the power cable along the rail comprises pulling at least one holder by a pulling rope.

6. The method of claim 5, wherein the sub-step of fixing the shortened holder predetermined distance is attained by connecting the pulling rope, connected to a first holder of the two consecutive cable holders for pulling it before the sagged portion of the power cable is obtained, to a second holder of the two consecutive cable holders once the sagged portion of the power cable is obtained.

7. The method of claim 1, wherein the sub-step of fixing the shortened holder predetermined distance is attained by connecting a spacer to the two consecutive cable holders.

8. The method of claim 7, wherein the spacer is a rod or a rope connected to the holders.

9. The method of claim 1, wherein the plurality of sub-steps for deploying of the power cable along the rail further comprises:
   stopping the power cable from advancing when the lowering device is halfway between the two consecutive cable holders on the power cable before the sub-step of engaging the cable portion between the consecutive cable holders by operating the festooning apparatus to move the lowering device from the raised position towards the lowered position; and
   re-starting the advancing of the power cable after the sub-step of disengaging the cable portion between the consecutive cable holders by operating the festooning apparatus to move the lowering device from the lowered position towards the raised position.

10. A method for deploying a power cable along a rail, the power cable being provided with cable holders slidable along the rail, the method comprising:
   engaging, on the rail, one cable holder of the cable holders after the other and moving them thereon;
   after one of the cable holders oversteps a festooning apparatus, moving a lowering device from a raised position towards a lowered position so as to engage the power cable at a point between two consecutive cable holders, each two consecutive cable holders being spaced at a holder predetermined distance on the power cable;

after the lowering device reaches the lowered position, obtaining a sagged portion of the power cable and shortening the holder predetermined distance;

moving the lowering device from the lowered position towards the raised position so as to disengage the power cable;

fixing the shortened holder predetermined distance between two consecutive holders at each side of the sagged portion of the power cable; and advancing the sagged portion of the power cable along the rail.

11. The method of claim 10, further comprising:

operating the festooning apparatus to move from a second side position to a first side position before the lowering device is moved from the raised position towards the lowered position, the festooning apparatus being movable transversally to the power cable advancing direction along the rail between the first side position closer to the power cable and the second side position farther from the power cable; and operating the festooning apparatus to move from the first side position to the second side position after the lowering device is moved from the lowered position towards the raised position.

12. The method of claim 10, further comprising repeating the engaging, the moving the lowering device from the raised position, obtaining a sagged portion of the power cable and shortening the holder predetermined distance, the moving the lowering device from the lowered position, and the fixing while maintaining the cable advancing along the rail.

13. The method of claim 10, further comprising pulling at least one cable holder by a pulling rope.

14. The method of claim 13, wherein fixing the shortened holder predetermined distance is attained by connecting the pulling rope, connected to a first holder of the two consecutive cable holders for pulling it before the sagged portion of the power cable is obtained, to a second holder of the two consecutive cable holders once the sagged portion of the power cable is obtained.

15. The method of claim 10, wherein fixing the shortened holder predetermined distance is attained by connecting a spacer to the two consecutive cable holders.

16. The method of claim 15, wherein the spacer is a rod or a rope connected to the cable holders.

17. The method of claim 10, further comprising:

stopping the cable from advancing when the lowering device is halfway between the two consecutive holders on the cable before engaging the cable portion between the consecutive cable holders by moving the lowering device from the raised position towards the lowered position; and re-starting the advancing of the power cable after disengaging the cable portion between the consecutive cable holders by moving the lowering device from the lowered position towards the raised position.

18. A method for festooning a power cable being deployed along a rail, the power cable being provided with a plurality of cable holders slidable along the rail, the method comprising:

engaging, on the rail, one cable holder of the plurality of cable holders after the other and moving them thereon;

moving a lowering device from a raised position towards a lowered position so as to engage the power cable at a point between two consecutive cable holders, each two consecutive cable holders being spaced at a holder predetermined distance on the power cable;

after the lowering device reaches the lowered position, obtaining a sagged portion of the power cable and shortening the holder predetermined distance;

moving the lowering device from the lowered position towards the raised position so as to disengage the power cable;

fixing the shortened holder predetermined distance between two consecutive holders at each side of the sagged portion of the power cable; and advancing the sagged portion of the power cable along the rail.

19. The method of claim 18, further comprising pulling at least one cable holder by a pulling rope, wherein fixing the shortened holder predetermined distance is attained by connecting the pulling rope, connected to a first holder of the two consecutive cable holders for pulling it before the sagged portion of the power cable is obtained, to a second holder of the two consecutive cable holders once the sagged portion of the power cable is obtained.

20. The method of claim 18, further comprising:

stopping the cable from advancing when the lowering device is halfway between the two consecutive holders on the cable before engaging the cable portion between the consecutive cable holders by moving the lowering device from the raised position towards the lowered position; and re-starting the advancing of the power cable after disengaging the cable portion between the consecutive cable holders by moving the lowering device from the lowered position towards the raised position.

* * * * *